UNITED STATES PATENT OFFICE.

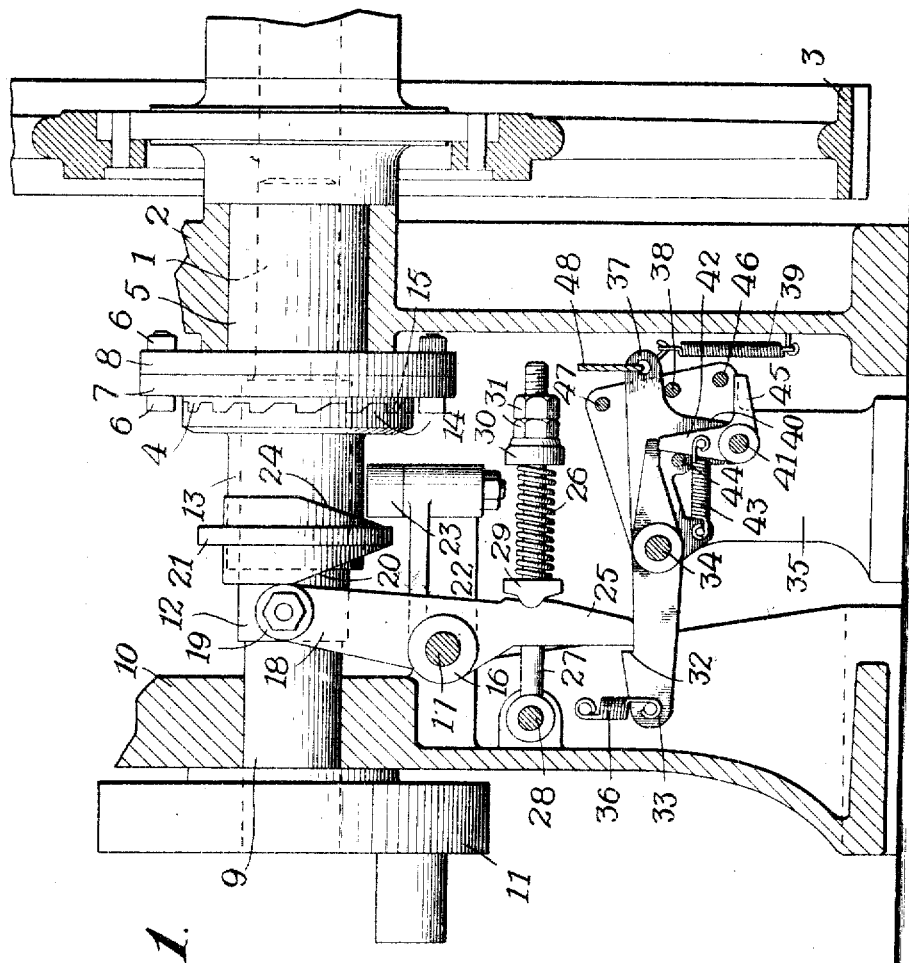

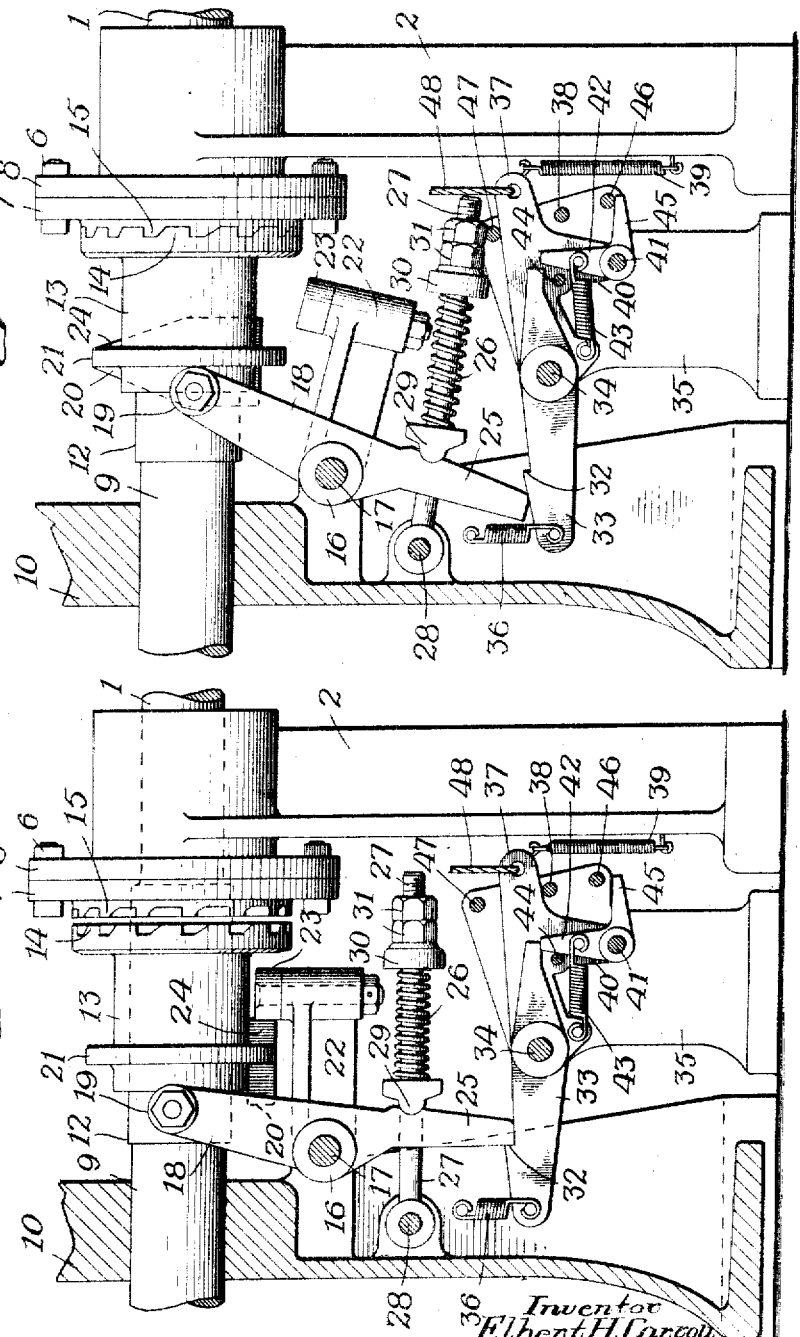

ELBERT H. CARROLL, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

CLUTCH-OPERATING MECHANISM.

1,383,525.

Specification of Letters Patent. Patented July 5, 1921.

Application filed July 21, 1917. Serial No. 182,069.

*To all whom it may concern:*

Be it known that I, ELBERT H. CARROLL, a citizen of the United States, residing at Worcester, in the county of Worcester and Commonwealth of Massachusetts, have invented a new and useful Improvement in a Clutch-Operating Mechanism, of which the following, together with the accompanying drawings, is a specification.

The present invention relates to operating mechanism for clutches, and is adapted for use with clutches in which the clutching elements are intermittently thrown into engagement to effect a predetermined angular movement of a driven member from a constantly rotating driving member.

In certain classes of heavy and massive machinery for the transmission of considerable power, the movement of such clutching elements into and out of engagement with the necessary rapidity is almost impossible of accomplishment by hand, due to the weight and inertia of such parts. Moreover, when, as is often the case, the driven member is only to be rotated a single revolution, or part of a revolution, the difficulties of hand operation are increased, since it becomes impossible for an operator, especially when the parts to be moved are massive, to effect their movements at the proper times.

The present invention contemplates the provision of an operating mechanism for clutches of this class which is wholly automatic in its operation, as soon as the attendant sets the same in motion. According to my invention, all the power required to move the clutching elements both into and out of engagement is furnished by the source of power whose transmission is desired, and thus the necessity for hand manipulation of the heavy parts is eliminated. Furthermore, owing to this automatic operation, the disengagement of the clutching elements is effected at exactly the required time, and thus all danger of rotating the driven member more than the desired single revolution, or part of a revolution, is avoided.

The above and other objects, which will become apparent as the description proceeds, are fully set forth hereinafter and pointed out in the annexed claims, reference being had in connection with said description to the accompanying drawings, in which—

Figure 1 is a side view, partly in section, of a clutch operating mechanism embodying my invention.

Fig. 2 is a similar view, showing the parts in a different position, and

Fig. 3 is a similar view, showing the parts in a still different position.

Like reference characters refer to like parts in the different figures.

Referring to Fig. 1, there is shown, in connection with the clutch operating mechanism of my invention, a driving shaft 1, suitably mounted in a bearing or support 2 and rotated continuously by a gear 3, or the like, from any suitable source of power, not shown. A cylindrical engaging member 4 surrounds the outer end of shaft 1 and is secured to the hub 5 of gear wheel 3 by bolts 6 passing through the flanges 7 and 8 of the engaging member 4 and the hub 5 respectively.

The driven shaft 9, in alinement with the driving shaft 1, is adapted to be rotated in a bearing or support 10, and carries at its outer end the element 11, whose intermittent rotation, through predetermined angles, is desired. The shaft 9 is squared, or otherwise made angular, at 12, on its inner end, to slidably fit the corresponding opening of a sleeve 13, which latter is free to slide longitudinally on said shaft, but is prevented from rotating relatively to said shaft. The adjacent faces of sleeve 13 and member 4 are provided with coöperating teeth 14 and 15 respectively, so that, when the sleeve is in the position shown in Figs. 1 and 3, the teeth 14 will engage the teeth 15 so as to be driven thereby, and thus through sleeve 13 to drive the shaft 9. When the sleeve 13 is moved, by the mechanism hereinafter described, into the position shown in Fig. 2, the teeth 14 and 15 are carried out of engagement, thus disconnecting the driven member 9 from the driving member 1.

For reciprocating the sleeve 13 on the squared end 12 of shaft 9, as required by the purposes of my mechanism, I provide a yoke structure 16, in the form a bell crank, which is pivoted at 17 to the stationary support 10. One arm 18 of said yoke carries a cam roll 19 which coöperates with a face cam 20 on one side of an annular flange 21 on sleeve 13. Another integral arm 22 of said yoke carries a cam roll 23, which is adapted to coöperate with a face cam 24 on the opposite side of flange 21 from the face cam 20. A third integral arm 25 of said yoke projects downwardly, and is acted upon, below its pivot 17, by a compression spring 26, which surrounds a rod or bar 27 that is pivoted at 28 in the stationary support 10. The arm 25, which may be notched or slotted for the free movement of rod 27 adjacent thereto, provides a concave recess in its edge for the reception of the convex face of a block 29 which is slidable on said rod. The spring 26 is confined between said block 29 and a normally fixed collar 30 on said rod, said collar being adjustable, by means of nuts 31, to vary the tension of said spring. The force of said spring is exerted to press the cam roll 19 against cam 20, and at appropriate intervals to rock the yoke 16, so as to move sleeve 13 from the position shown in Fig. 2 to the position shown in Fig. 3, thereby causing the operative engagement of the clutching elements.

To this end, the lower end of arm 25 is adapted to coöperate with a shoulder 32 on a lever 33 which is pivoted at 34 in a stationary support 35, and is normally held in the position shown in Fig. 2 by means of a spring 36, with the arm 25 in engagement with shoulder 32, to lock the yoke 16 against movement by the compressed spring 26. Also pivoted at 34 is an arm 37, which is normally held depressed against a stationary stop 38, by means of a light spring 39. Said arm 37 has a depending extension 40, to the lower end of which, at 41, is pivoted a latch 42, which is held yieldingly by a spring 43 against a stop 44, with its free end disposed below the adjacent end of lever 33, as shown in Fig. 2.

The pivoted latch 42 has integral therewith a trip arm 45, in the path of which is disposed a stationary stop or abutment 46. The pivoted arm 37 is adapted to be oscillated for the purpose of inaugurating the automatic operation of the above described mechanism, being movable, for this purpose, through a small arc between the fixed stop 38 which engages its lower edge and a fixed stop 47 which engages its upper edge. To this end a cord, or other operating means 48 may be attached to said arm, with its other end convenient to the operator, who may be stationed at some distance from the clutch. Obviously, any desired means may be employed to operate the arm 37, such for instance, as a solenoid, not shown. To operate said arm requires only that the light spring 39 be overcome, and this action, requiring no appreciable draft, is sufficient to effect the movements of the massive clutch elements, as hereinafter described.

The operation of my improved clutch operating mechanism is as follows:—With the parts in the positions indicated in Fig. 2, the arm 37 being depressed, the yoke 16 is locked against operative movement, due to its engagement with shoulder 32 and notwithstanding the fact that the spring 26 is under extreme compression. In this position of the parts the clutching elements have been disconnected, as shown, since the high part of face cam 24 has been carried against cam roll 23, thus moving the sleeve 13 to the left, Fig. 2. When the arm 37 is rocked upwardly, by a draft thereon which needs only to overcome the light spring 39, the initial upward movement of latch 42 raises the adjacent end of lever 33 and thus depresses shoulder 32 of said lever enough to release arm 25 of yoke 16. The full force of compressed spring 26 is thereby made effective to rock said yoke into the position shown in Fig. 3, this action occurring when the low part of cam 24 is adjacent cam roll 23 and thus permitting the depression of said cam roll and the forward movement of sleeve 13 under the influence of said spring. Further upward movement of arm 37 and latch 42 brings the trip arm 45 of said latch against fixed stop 46, whereby said latch is rocked into the position shown in Fig. 3, so as to be withdrawn from beneath the adjacent end of lever 33. With the parts thus carried into the position shown in Fig. 3, by the expansive force of spring 26, the clutching elements are rendered operative to rotate the driven shaft 9 in unison with the driving shaft 1, and this rotation continues while the raised cam 20 is coming into contact with the cam roll 19. As the higher portions of said cam become progressively available, the yoke 16 is being rocked back to its normal position, and the expanded spring 26 is being recompressed on the rod 27, the clutching elements still remaining in engagement. Finally, just as the highest portion of cam 20 is reached, the cam roll 23, which has been returned to operative position, is reached by the rising portion of cam 24, as shown in Fig. 1, and thereupon the sleeve 13 is moved to the left, to disengage the clutching elements at the completion of a single revolution of the driven member. The return of yoke 16 to normal position has in the meantime brought the arm 25 again behind the shoulder 32, the spring 36 permitting the necessary depression of lever 33 for this purpose, and thereafter insuring against the release of said yoke. It will thus be seen that only a single revolution of the driven member is possible, even though the operator should hold the arm 37 in its elevated position indefinitely. It is not possible to obtain another revolution of the driven member until the arm 37 is first returned to the position shown in Fig. 2 and then elevated again to the position shown in Fig. 3, to allow the latch 42 to lift the lever 33.

By my invention the power required to move the clutching elements into and out of engagement is furnished by the machine itself, and the only force exerted by the operator is that required to overcome the light spring 39. The power to move the sleeve 13 is stored up at each revolution of the driven member in the spring 26, and this power is not available until the arm 37 is elevated. With the construction shown, it is impossible to obtain more than one revolution of the driven member at one time, since the power of the machine is employed through the cam 24 to throw the clutch out of engagement after a single revolution has been completed. Obviously, by the provision of additional cams on the flange 21 of sleeve 13, any desired rotation of the driven member less than one revolution can be provided for, and obviously such partial revolutions cannot be repeated without returning the arm 37 to its normal position, shown in Fig. 2.

I claim,

1. The combination with a pair of engageable clutch members, of a pressing means for moving said members into engagement, means responsive to the rotation of said members for relieving the pressure of said pressing means, means responsive to the further rotation of said members for moving said members out of engagement, and means for automatically locking said pressing means in inoperative position.

2. The combination, with a pair of engageable clutch members, of means responsive to the rotation of said members in unison through a predetermined angle for storing up a force adapted to move said members into engagement, means responsive to the rotation of said members for relieving them of said force, and means responsive to the further rotation of said members in unison for moving them out of engagement.

3. The combination, with a pair of engageable clutch members, of a pressing means for moving said members into engagement, means operable by the rotation of said members in unison through a predetermined angle for relieving the pressure of said pressing means, and for thereafter moving said members out of engagement, and means for automatically locking said pressing means against operation after each predetermined rotation in unison of said members.

4. The combination, with a pair of engageable clutch members, of a pressing means adapted to move them into engagement, latching means normally holding said pressing means inoperative, an operating member adapted for movement to release said latching means, whereby to render said pressing means effective to move said clutch members into engagement, and means responsive to a predetermined rotation of said members in unison for relieving the pressure of said pressing means, and for thereafter moving said members out of engagement.

5. The combination with a pair of engageable clutch members and a spring for moving said members into engagement, of means responsive to the rotation of said members in unison through a predetermined angle for compressing said spring, other means for retaining it in compression, and means responsive to the further rotation of said members in unison for moving them out of engagement.

6. The combination with a pair of engageable clutch members and a spring pressed arm for moving said members into engagement, of a cam carried by one of said clutch members for moving said arm against said spring upon the rotation of said members in unison through a predetermined angle, means for locking said arm in position with the spring compressed, and a second cam for moving said clutch members out of engagement upon the further rotation of said members in unison.

7. The combination, with a pair of engageable clutch members, of a pressing means adapted to move them into engagement, latching means normally holding said pressing means inoperative, an operating member adapted for movement to release said latching means, whereby to render said pressing means effective to move said clutch members into engagement, means operable by the rotation of said clutch members through a predetermined angle for rendering said pressing means inoperative, means for thereafter separating said clutching members, and means for preventing the reengagement of said clutching members until said operating member has been returned to normal position.

Dated this 18th day of July, 1917.

ELBERT H. CARROLL.

Witnesses:
CHESTER H. FAY,
THEODORE H. NYE.